United States Patent
Gruen et al.

(10) Patent No.: US 9,129,443 B2
(45) Date of Patent: Sep. 8, 2015

(54) CACHE-EFFICIENT PROCESSOR AND METHOD OF RENDERING INDIRECT ILLUMINATION USING INTERLEAVING AND SUB-IMAGE BLUR

(71) Applicant: Nvidia Corporation, Santa Clara, CA (US)

(72) Inventors: Holger Gruen, Munich (DE); Louis Bavoil, Courbevoie (FR)

(73) Assignee: NVIDIA CORPORATION, Santa Clara, CA (US)

( * ) Notice: Subject to any disclaimer, the term of this patent is extended or adjusted under 35 U.S.C. 154(b) by 218 days.

(21) Appl. No.: 13/899,053

(22) Filed: May 21, 2013

(65) Prior Publication Data

US 2014/0347359 A1 Nov. 27, 2014

(51) Int. Cl.
*G06T 15/50* (2011.01)
*G06T 1/60* (2006.01)
*G06T 15/60* (2006.01)

(52) U.S. Cl.
CPC ............. *G06T 15/503* (2013.01); *G06T 1/60* (2013.01); *G06T 15/506* (2013.01); *G06T 15/60* (2013.01)

(58) Field of Classification Search
None
See application file for complete search history.

(56) References Cited

U.S. PATENT DOCUMENTS

| | | | |
|---|---|---|---|
| 2011/0012901 A1* | 1/2011 | Kaplanyan | 345/426 |
| 2013/0328873 A1* | 12/2013 | Harada et al. | 345/422 |
| 2014/0029849 A1* | 1/2014 | Sen et al. | 382/167 |

OTHER PUBLICATIONS

Nichols, Greg, Jeremy Shopf, and Chris Wyman. "Hierarchical Image-Space Radiosity for Interactive Global Illumination." Computer Graphics Forum. vol. 28. No. 4. Blackwell Publishing Ltd, 2009.*
Nichols, Greg, and Chris Wyman. "Multiresolution splatting for indirect illumination." Proceedings of the 2009 symposium on Interactive 3D graphics and games. ACM, 2009.*
Dachsbacher, Carsten, and Marc Stamminger. "Reflective shadow maps."Proceedings of the 2005 symposium on Interactive 3D graphics and games. ACM, 2005.*
Keller, Alexander, and Wolfgang Heidrich. Interleaved sampling. Springer Vienna, 2001.
Soler, Cyril, et al. "Hierarchical Screen Space Indirect Illumination for Video Games." (2009).
Segovia, Benjamin, et al. "Non-interleaved deferred shading of interleaved sample patterns." SIGGRAPH/EUROGRAPHICS Conference on Graphics Hardware: Proceedings of the 21 st ACM SIGGRAPH/Eurographics symposium on Graphics hardware: Vienna, Austria. vol. 3. No. 4. 2006.

* cited by examiner

*Primary Examiner* — Kee M Tung
*Assistant Examiner* — Ryan D McCulley (57) ABSTRACT

A cache-efficient processor and method for rendering indirect illumination using interleaving and sub-image blur. One embodiment of the processor is configured to render an indirect illumination image and includes: (1) a buffer restructurer configured to organize a reflective shadow map (RSM), rendered with respect to a reference point, into a plurality of unique sub-RSMs, each having sub-RSM pixels, (2) an indirect illumination computer configured to employ interleaved sampling on the plurality of unique sub-RSMs to generate a plurality of indirect illumination sub-images, and (3) a filter operable to smooth accumulated light values of the indirect illumination sub-images for subsequent interleaving into the indirect illumination image.

19 Claims, 5 Drawing Sheets

CACHE-EFFICIENT PROCESSOR AND METHOD OF RENDERING INDIRECT ILLUMINATION USING INTERLEAVING AND SUB-IMAGE BLUR

TECHNICAL FIELD

This application is directed, in general, to computer graphics rendering and, more specifically, to the rendering of indirect illumination.

BACKGROUND

Many computer graphic images are created by mathematically modeling the interaction of light with a three dimensional scene from a given viewpoint. This process, called "rendering," generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

A variety of shading programs are directed at modeling illumination in a scene. The physical plausibility of rendered illumination often depends on the application, more specifically, whether or not the rendering is done in real-time. Physically plausible illumination at real-time frame rates is often achieved using approximations. For example, ambient occlusion is a popular approximation because of its high speed and simple implementation. Another example is directional occlusion. Many algorithms can only approximate direct illumination, which is light coming directly from a light source.

Global illumination is a concept that accounts for both direct illumination and indirect illumination, which is light that reflects off other surfaces, in rendering the scene. In doing so, a significantly more realistic image is achievable. However, real-time global illumination remains problematic for large and dynamic scenes. Efforts to mitigate the latency introduced by these comprehensive illumination algorithms are ongoing. For example, some algorithms partially precompute illumination. Another example is instant radiosity, which models indirect lighting as a set of point lights, the contributions of which are accumulated over multiple rendering passes. Yet another approach is to limit indirect lighting to a single bounce, under the assumption that one-bounce indirect illumination is sufficiently realistic. Still, real-time frame rates are typically only achievable through approximations.

SUMMARY

One aspect provides a processor configured to render an indirect illumination image. In one embodiment, the processor includes: (1) a buffer restructurer configured to organize a reflective shadow map (RSM), rendered with respect to a reference point, into a plurality of unique sub-RSMs, each having sub-RSM pixels, (2) an indirect illumination computer configured to employ interleaved sampling on the plurality of unique sub-RSMs to generate a plurality of indirect illumination sub-images, and (3) a filter operable to smooth accumulated light values of the indirect illumination sub-images for subsequent interleaving into the indirect illumination image.

Another aspect provides a method of rendering indirect illumination for a full-resolution image of a scene. In one embodiment, the method includes: (1) rendering the scene into a RSM in light-space and a camera-view G-buffer, (2) restructuring the RSM into sub-RSMs and the camera-view G-buffer into camera-view sub-buffers representing sub-images of the full-resolution image, (3) employing interleaved sampling on the sub-RSMs and the camera-view sub-buffers to compute indirect illumination for each pixel in each of the sub-images, thereby generating indirect illumination sub-images, (4) blurring the indirect illumination sub-images, and (5) interleaving blurred indirect illumination sub-images into a higher-resolution indirect illumination image.

Yet another aspect provides a graphics processing subsystem. In one embodiment, the subsystem includes: (1) a memory configured to store a light-space RSM data structure according to which a RSM rendered with respect to a light source is represented by a plurality of unique reduced-resolution sub-RSMs, and (2) a processor configured to gain access to the memory via a data bus and operable to: (2a) employ the plurality of unique reduced-resolution sub-RSMs to compute a plurality of reduced-resolution indirect illumination sub-images, (2b) apply a blurring effect to each of the plurality of reduced-resolution indirect illumination sub-images, and (2c) interleave the plurality of reduced-resolution indirect illumination sub-images into a higher-resolution indirect illumination image.

BRIEF DESCRIPTION

Reference is now made to the following descriptions taken in conjunction with the accompanying drawings, in which.

DETAILED DESCRIPTION

Indirect illumination is typically implemented in renderers as a one-bounce approximation of diffuse inter-reflected light. For simplicity, assume a scene has a single light source. One way to achieve the approximation is by rendering a scene with respect to the light source, or from the vantage point of the light, otherwise referred to as "light-space." The resulting buffer would be considered a shadow map, as it depicts every surface the light source reaches. These are often used to generate shadows, as the intersection of the shadow map and a screen-space image, or an image rendered from the vantage point of the camera, would be a rendering of direct illumination. Continuing the assumption of a single light source, all one-bounce indirect illumination can be approximated by surfaces visible in the shadow map. Each pixel in the shadow map can be considered a small area light source that illuminates the scene. Because the shadow map is of a limited resolution, small areas casting indirect light may be under-represented. The light contributions of each of the small area light sources to each pixel in the screen-space image can be calculated in a variety of ways based on the data available in the geometry buffers (G-buffers) rendered from the vantage point of the camera, or in screen-space, and data available in light-space buffers. A buffer rendered in light-space is sometimes referred to as a reflective shadow map (RSM), as it typically contains data relevant to indirect illumination.

Ideally, when calculating the indirect illumination of a pixel in screen-space, every pixel in light-space, or in the RSM, would be considered. Practically, considering every pixel would be computationally expensive and unnecessary. Light-space pixels are typically sampled and the number of small area light sources limited. Some implementations further reduce the number of small area light sources considered by using interpolation. A common approach is to project the illuminated pixel into light-space and sample nearby small area light sources. The idea being that nearby pixels in light-space are generally nearby in screen-space, and are therefore most likely to reflect and contribute light to the pixel being illuminated. The light contribution of each small area light source sample can then be determined based on a variety of light-space RSM and camera-view G-buffer data, including position, depth, surface normal, color energy flux, material parameters and others. The contributions are accumulated for each pixel in screen-space, producing an indirect-illumination image.

This procedure, which assumes a single light source for the scene, can be repeated for every light source. Additionally, the direct illumination of each light source can be accumulated for each pixel in screen-space. These accumulations can all be combined and processed to produce a realistic global illumination image. Processing may include: interpolation, up-sampling, down-sampling, blurring, normalizing and a variety of other processes.

It is realized herein the sampling process is a significant limitation of conventional indirect illumination algorithms. Each light-space pixel is represented in a RSM, in memory, as a texel. Likewise, each screen-space pixel is represented in memory as a texel in a camera-view G-buffer. As nearby light-space pixels are sampled, texels are fetched from memory. The RSM and camera-view G-buffers are initially rendered into one block of memory, where they remain for as long as is needed for rendering that frame. When texels are fetched from the one block, they are moved into a second, smaller block known as a texture cache. When compared to retrieving G-buffer data or RSM data from the one block, retrieving from the texture cache is much faster. Once a texel is in the texture cache, the latency of subsequent fetch operations to this texel or to neighboring texels is reduced. However, the capacity of the texture cache is limited, and the random sampling often employed in indirect illumination algorithms results in "cache trashing." For example, consider sampling and fetching about adjacent pixels in the RSM. Random sampling of the full-resolution RSM about the adjacent pixels results in fetching of non-adjacent texels for indirect illumination processing.

It is realized herein the G-buffers and RSM rendered for indirect illumination can be restructured into reduced-resolution sub-buffers and sub-RSMs, and the full-resolution images restructured into reduced-resolution sub-images. This allows the same amount of data to be represented in interleaved sub-images, each containing a fraction of the pixels, and the sub-buffers and sub-RSMs each containing a fraction of the texels of the full-resolution. It is further realized herein that as each sub-image is sampled, the texture cache hit rate is improved for fetching data from the sub-buffers and sub-RSMs. Given the sub-images, sub-buffers and sub-RSMs, indirect illumination sub-images can be generated and interleaved to produce a full-resolution indirect illumination image. Alternatively, the sub-RSMs and sub-images can be paired with a full-resolution camera-view G-buffer to use in computing indirect illumination. It is also realized herein that rendering from the vantage point of the light source is not necessary, as indirect illumination can be calculated based on data rendered from any point of view, including the camera view (screen-space). However, rendering in light-space and restructuring does yield reliably good sub-RSMs and sub-images that produce physically plausible indirect illumination.

It is also realized herein that, in certain embodiments, each sub-RSM pixel is drawn from the full-resolution RSM at irregular intervals. This shuffling of pixels in the full-resolution image before restructuring can introduce useful noise that helps hide structured artifacts.

It is realized herein that further latency and memory bandwidth improvements can be made by carrying out processing on indirect illumination sub-images as opposed to processing higher-resolution images. A common stage of indirect illumination is to blur, or "smooth" the accumulated light. Applying blur, or "filtering" the sub-images, it is realized herein, smoothens the accumulated light while preserving detected geometric discontinuities. One example of such filtering is cross-bilateral blurring, which uses per-pixel data to compute weights for averaging values of nearby pixels. Cross-bilateral blurring can use color, depth, normal and other data from the light-space and camera-view sub-buffers. Cross-bilateral blurring can also be applied multiple times, for example, applying a cross-bilateral filter horizontally to the image, and then applying a cross-bilateral filter vertically to the resulting image. The "blurred" indirect illumination sub-images can then be interleaved into a higher-resolution indirect illumination image. Additionally, it is realized herein, the higher-resolution indirect illumination image can be further blurred, for instance, by applying yet another cross-bilateral filter to the higher-resolution indirect illumination image.

It is also realized herein that a direct illumination image can be rendered from the camera-view G-buffer that can be combined with the indirect illumination image, provided the respective resolutions match. Cross-bilateral up-sampling can be used to bring the resolution of one image up to the other. For example, applying cross-bilateral up-sampling to the higher-resolution indirect illumination image to bring it up to the full-resolution of the camera-view G-buffer.

Before describing various embodiments of the processor and method for rendering indirect illumination introduced herein, a computing system within which the processor or method maybe embodied or carried out will be described.

Figure 1:
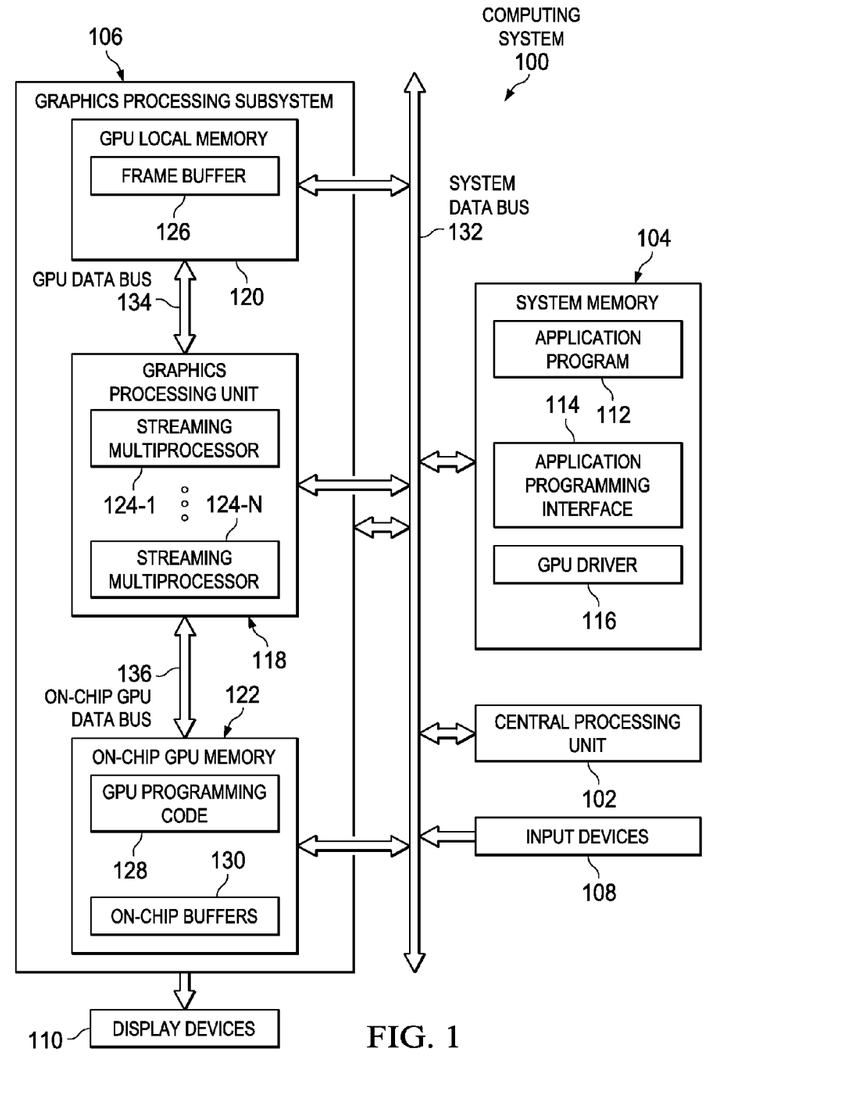
FIG. 1 is a block diagram of one embodiment of a computing system in which one or more aspects of the invention may be implemented.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the processor or method for rendering indirect illumination may be embodied or carried out, various embodiments of the processor and method will be described.

Figure 2:
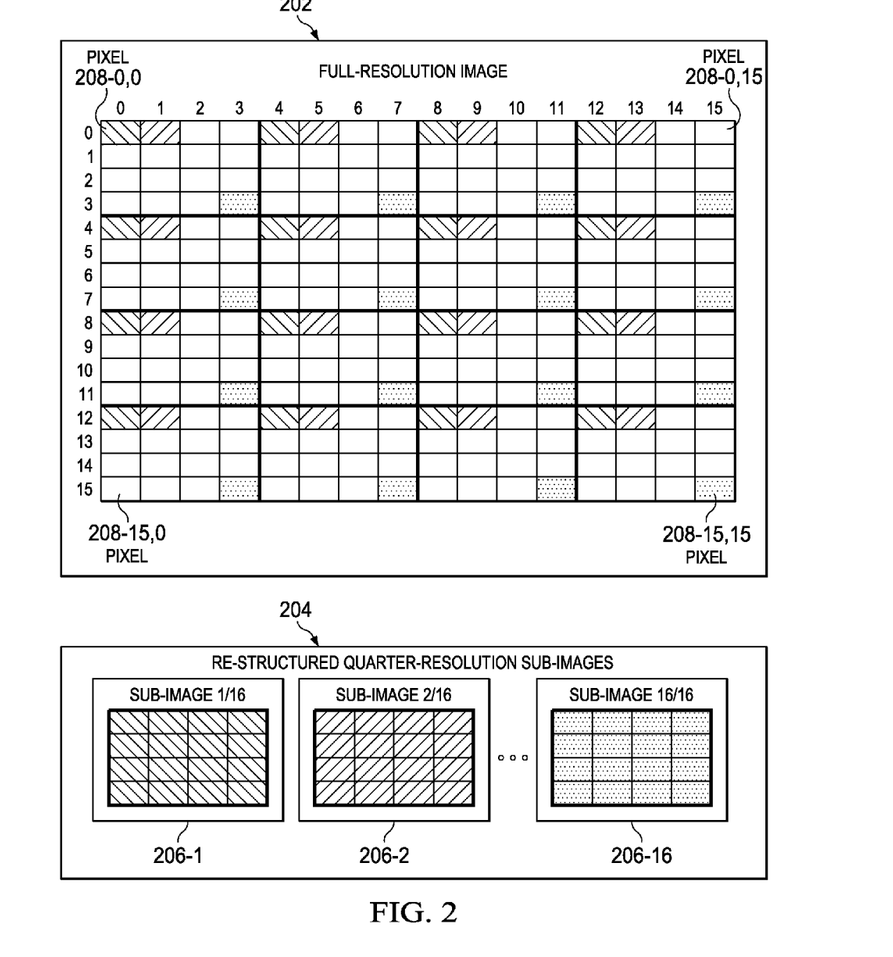
FIG. 2 is an illustration of a full-resolution image being restructured into sub-images.

FIG. 2 is an illustration of one embodiment of a restructuring of a full-resolution image 202. The restructuring organizes pixels into multiple reduced-resolution sub-images. In the illustrated embodiment, full-resolution image 202 is restructured into quarter-resolution sub-images 204. In the illustrated embodiment, "quarter-resolution" is with respect to each of the X and Y dimensions, yielding sixteen sub-images 206-1 through 206-16. Alternative embodiments may restructure full-resolution image 202 into half-resolution, sixth-resolution, eighth-resolution, or any other fraction of the full-resolution data. The embodiment of FIG. 2 employs a 16×16 resolution image composed of 256 pixels 208-0,0 through 208-15,15. Other embodiments employ a 2560×1600, 1920×1080 or any other image resolution. The embodiment in FIG. 2 divides the 16×16 full-resolution image 202 into sixteen cells illustrated by bold lines. Each sub-image 206 is composed of each like-positioned pixel 208 in each of the sixteen cells. For example, a first sub-image 206-1 is composed of pixels 208-0,0, 208-0,4, 208-0,8, and on through pixel 208-12,12. Similarly, a second sub-image 206-2 is composed of pixels 208-0,1, 208-0,5, 208-0,9, . . . , 208-12,13. In the illustrated embodiment, the pixels of the second sub-image 206-2 are offset by one full-resolution pixel in the horizontal dimension from the first sub-image 206-1. Accordingly, each subsequent sub-image 206-N is similarly offset in at least one dimension, ending with a final sub-image 206-16 composed of pixels 208-3,3, 208-3,7, 208-3,11, and on through pixel 208-15,15.

Figure 3:
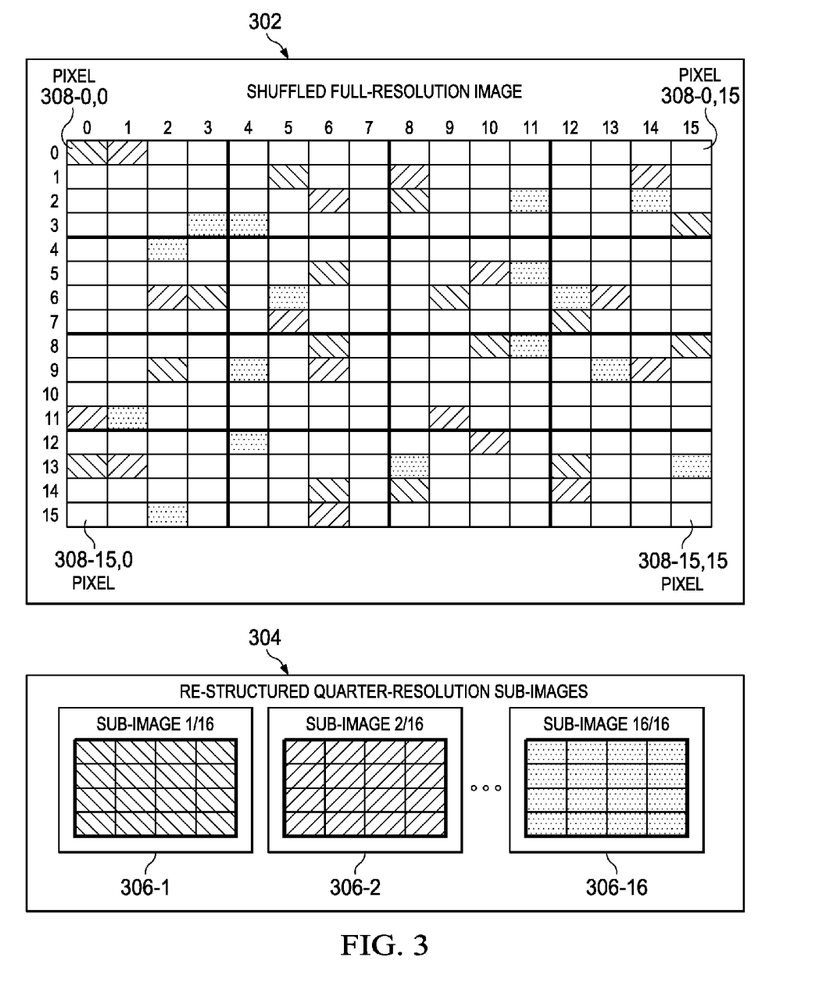
FIG. 3 is another illustration of the full-resolution image of FIG. 2 being restructured with pixel shuffling.

FIG. 3 is an illustration of another embodiment of the restructuring depicted in FIG. 2 with the addition of pixel-shuffling before restructuring. In pixel-shuffling, each of the sub-image pixels is drawn from the full-resolution image at irregular intervals. For example, in the illustrated embodiment, a full-resolution image 302 is restructured into quarter-resolution sub-images 304, as full-resolution image 202 was in FIG. 2. Rather than each sub-image 306 be composed of each like-positioned pixel 308 in each of the sixteen cells, each sub-image 306 is composed of an unlike-positioned pixel 308 in each of the sixteen cells. For example, a first sub-image 306-1 is composed of pixels 308-0,0, 308-1,5, 308-2,8, 308-3,15 and on through pixel 308-13,12. Similarly, a second sub-image 306-2 is composed of pixels 308-0,1, 308-2,6, 308-1,8, 308-1,14, . . . , 308-14,12. In the illustrated embodiment, the pixels of the second sub-image 306-2 are offset by at least one full-resolution pixel in the horizontal or vertical dimension from the first sub-image 306-1. Accordingly, each subsequent sub-image 306-N is similarly offset in at least one dimension, ending with a final sub-image 306-16 composed of pixels 308-3,3, 308-3,4, 308-2,11, 308-2,14, and on through pixel 308-13,15. Pixel shuffling introduces noise into subsequent processing of the sub-images, helping reduce the occurrence of structured artifacts. Shuffling need not be identical to the illustrated embodiment, in fact, the shuffling can be done randomly, to the extent the original image remains recoverable.

Figure 4:
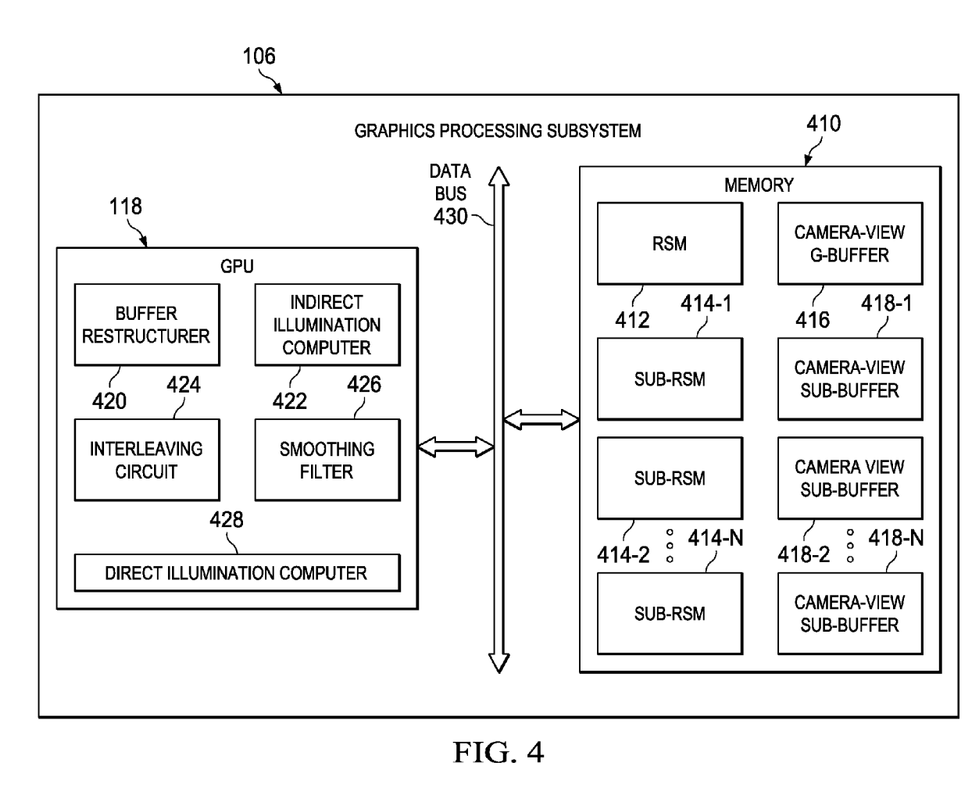
FIG. 4 is a block diagram of one embodiment of a graphics processing subsystem.

FIG. 4 is a block diagram of one embodiment of graphics processing subsystem 106 of FIG. 1, including GPU 118 and a memory 410 accessible via a data bus 430. Memory 410 is configured to store a RSM 412 and a camera-view G-buffer 416. RSM 412 is rendered from the vantage point of a light source. Camera-view G-buffer 416 is rendered from the vantage point of the camera. Memory 410 is also configured to store a plurality of sub-RSMs 414-1, 414-2 and on through 414-N, and a plurality of screen-space sub-buffers 418-1, 418-2 and on through 418-N.

GPU 118 includes a buffer restructurer 420, an indirect illumination computer 422, an interleaving circuit 424, a smoothing filter 426 and a direct illumination computer 428. Buffer restructurer 420 is configured to gain access to memory 410 via data bus 430 and restructure RSM 412 into sub-RSMs 414-1 through 414-N. In certain embodiments, buffer restructurer 420 is further configured to restructure camera-view G-buffer 416 into camera-view sub-buffers 418-1 through 418-N. Indirect illumination computer 422 is configured to approximate one-bounce indirect illumination for each pixel represented in camera-view G-buffer 416. Each pixel is projected to a light-space position about which nearby RSM pixels are sampled. Each RSM pixel sampled is considered a small area light source that potentially contributes light. Indirect illumination computer 422 uses data in sub-RSMs 414-1 through 414-N and in camera-view sub-buffers 418-1 through 418-N to compute the sampled pixels contribution and accumulate an indirect illumination value for each screen-space pixel, yielding indirect illumination sub-images. In alternate embodiments, indirect illumination computer 422 uses data in light-space sub-buffers 414-1 through 414-N with the full-resolution data in camera-view G-buffer 416 to form the indirect illumination sub-images.

The indirect illumination sub-images produced by indirect illumination computer 422 are run through smoothing filter 426, which smoothens out the accumulated light while preserving discontinuities where geometric discontinuities are detected. This is known as "sub-image blurring." The resulting blurred indirect illumination sub-images are then interleaved by interleaving circuit 242 to form a higher-resolution indirect illumination image. In certain embodiments, GPU 118 is configured to apply smoothing filter 426 a second time on the higher-resolution indirect illumination image. GPU 118 is operable to repeat this process for each light source in a particular scene.

Direct illumination computer 428 is configured to use data from either camera-view G-buffer 416 or screen-space sub-buffers 418-1 through 418-N to compute direct illumination on each screen-space pixel from each light source. The resulting direct illumination image can then be combined with the higher-resolution indirect illumination image to form a global illumination image.

Figure 5:
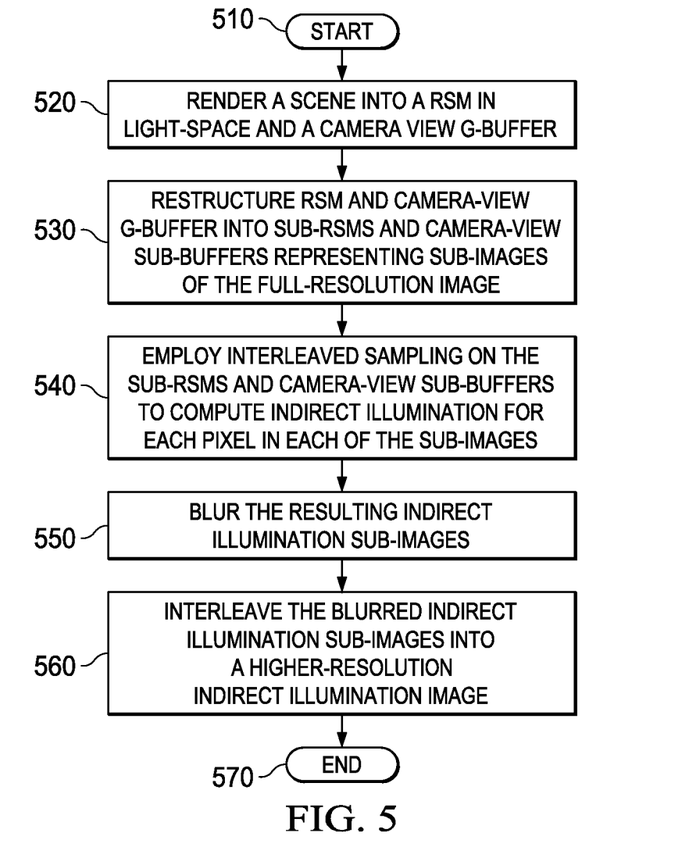
FIG. 5 is a flow diagram of one embodiment of a method for rendering indirect illumination.

FIG. 5 is a flow diagram of one embodiment of a method of rendering indirect illumination for a full-resolution image of a scene. The method begins in a start step 510. The scene is rendered into a RSM and a camera-view G-buffer in a rendering step 520. The RSM is rendered from the vantage point of a single light source, or "in light-space." The light-space full-resolution image is sometimes referred to as an RSM when rendered for the purpose of computing indirect illumination. Otherwise, when rendered for direct illumination, it would simply be a shadow map. Camera-view G-buffer is rendered from the vantage point of the camera. In a restructuring step 530, the RSM and camera-view G-buffer are restructured into sub-RSMs and camera-view sub-buffers, representing sub-images of the full-resolution image.

In a computing step 540, interleaved sampling is used to sample light-space pixels, or RSM pixels, about a screen-space pixel projected into light-space. From the sampled light-space pixels, which are each considered small area light sources, a one-bounce indirect illumination value is accumulated for the screen-space pixel. This is repeated for each pixel in screen-space, producing indirect illumination sub-images. The indirect illumination sub-images are blurred at sub-image blurring step 550. In certain embodiments a cross-bilateral blurring is first applied horizontally to the indirect illumination sub-images, and then secondly applied vertically. The blurred indirect illumination sub-images are interleaved into a higher-resolution indirect illumination image in an interleaving step 560.

In alternate embodiments, a direct illumination image is generated from the data in the camera-view G-buffer rendered in rendering step 520. Other embodiments may employ the restructured camera-view sub-buffers to produce the direct illumination image. The direct illumination image can be combined with the higher-resolution indirect illumination image produced at interleaving step 560.

In other embodiments, the higher-resolution indirect illumination image may undergo further blurring, in addition to that carried out in sub-image blurring step 550. The additional blurring helps smoothen the accumulated light while preserving geometric discontinuities. The method then ends in an end step 570.

Those skilled in the art to which this application relates will appreciate that other and further additions, deletions, substitutions and modifications may be made to the described embodiments.

What is claimed is:

1. A processor configured to render an indirect illumination image, comprising:
   a buffer restructurer configured to organize a reflective shadow map (RSM), rendered with respect to a reference view, into a plurality of unique sub-RSMs, each having sub-RSM pixels;
   an indirect illumination computer configured to employ interleaved sampling on said plurality of unique sub-RSMs to generate a plurality of indirect illumination sub-images; and
   a filter operable to smooth accumulated light values of said indirect illumination sub-images for subsequent interleaving into said indirect illumination image, wherein said organizing said RSM into said plurality of unique sub-RSMs comprises assigning each pixel of said RSM to a single sub-RSM so that each sub-RSM has a same resolution and number of said sub-RSM pixels as all other sub-RSMs.

2. The processor recited in claim 1 wherein said RSM includes pixel-wise buffers configured to store depth, color and normal data.

3. The processor recited in claim 1 further comprising a renderer configured to render said RSM and said reference view is a light source.

4. The processor recited in claim 1 wherein said filter is a cross-bilateral blurring filter.

5. The processor recited in claim 1 wherein said indirect illumination computer is further configured to employ interleaved sampling about each of said sub-RSM pixels to calculate and accumulate light contributions from neighboring sub-RSM pixels, thereby generating said plurality of indirect illumination sub-images.

6. The processor recited in claim 1 wherein each of said sub-RSM pixels is drawn from said RSM at irregular intervals.

7. A method of rendering indirect illumination for a full-resolution image of a scene, comprising:
   rendering said scene into a reflective shadow map (RSM) in light-space and a camera-view G-buffer;
   restructuring said RSM into sub-RSMs and said camera-view G-buffer into camera-view sub-buffers representing sub-images of said full-resolution image;
   employing interleaved sampling on said sub-RSMs and said camera-view sub-buffers to compute indirect illumination for each pixel in each of said sub-images, thereby generating indirect illumination sub-images;
   blurring said indirect illumination sub-images; and
   interleaving blurred indirect illumination sub-images into a higher-resolution indirect illumination image, wherein said restructuring said RSM into said sub-RSMs comprises assigning each pixel of said RSM to a single sub-RSM so that each sub-RSM has a same resolution and number of said sub-RSM pixels as all other sub-RSMs.

8. The method recited in claim 7 further comprising shuffling pixels of said RSM before said restructuring.

9. The method recited in claim 7 wherein said blurring includes cross-bilateral blurring.

10. The method recited in claim 7 wherein said employing includes:
    determining a pixel position in one of said sub-RSMs based on screen-space position;
    applying a sampling pattern about said pixel position to arrive at neighboring sub-RSM pixels; and
    accumulating light contributions from said neighboring sub-RSM pixels based on surface normal data.

11. The method recited in claim 7 wherein said RSM is rendered with respect to a light source.

12. The method recited in claim 7 further comprising:
    generating a direct illumination image based on said camera-view G-buffer; and
    combining said higher-resolution indirect illumination image with said direct illumination image to form a global illumination image.

13. The method recited in claim 12 further comprising applying cross-bilateral up-sampling to said higher-resolution indirect illumination image to match the resolution of said camera-view G-buffer.

14. A graphics processing subsystem, comprising:
    a memory configured to store a light-space reflective shadow map (RSM) data structure according to which a RSM rendered with respect to a light source is organized into a plurality of unique reduced-resolution sub-RSMs; and
    a processor configured to gain access to said memory via a data bus and operable to:
      employ said plurality of unique reduced-resolution sub-RSMs to compute a plurality of reduced-resolution indirect illumination sub-images,
      apply a blurring effect to each of said plurality of reduced-resolution indirect illumination sub-images, and
      interleave said plurality of reduced-resolution indirect illumination sub-images into a higher-resolution indirect illumination image, wherein said organizing said RSM into said plurality of unique sub-RSMs comprises assigning each pixel of said RSM to a single sub-RSM so that each sub-RSM has a same resolution and number of said sub-RSM pixels as all other sub-RSMs.

15. The graphics processing subsystem recited in claim 14 wherein said memory is further configured to store a camera-view geometry buffer (G-buffer) rendered with respect to a camera view-point and a camera-view G-buffer data structure according to which said camera-view G-buffer is represented by a plurality of unique reduced-resolution camera-view sub-buffers.

16. The graphics processing subsystem recited in claim 15 wherein said processor is further operable to employ said plurality of unique reduced-resolution camera-view sub-buffers to apply said blurring effect.

17. The graphics processing subsystem recited in claim 15 wherein said processor is further operable to employ said plurality of unique reduced-resolution camera-view sub-buffers to compute said plurality of reduced-resolution indirect illumination sub-images.

18. The graphics processing subsystem recited in claim 15 wherein said processor is further operable to render a direct illumination image based on said camera-view G-buffer.

19. The graphics processing subsystem recited in claim 18 wherein said processor is further operable to apply another blurring effect to said higher-resolution indirect illumination image and combine the blurred higher-resolution indirect illumination image with said direct illumination image to form a global illumination image.

* * * * *